(12) United States Patent
Lape et al.

(10) Patent No.: US 8,276,509 B2
(45) Date of Patent: Oct. 2, 2012

(54) METHOD AND APPARATUS FOR COMPRESSION OF LAMINATION STACK FOR A DYNAMOELECTRIC MACHINE

(75) Inventors: Brock Matthew Lape, Clifton Park, NY (US); Nihan Basaran, Istanbul (TR); Gary Robert Pink, Toccoa, GA (US); Steven Charles Walko, Clifton Park, NY (US); Stuart Alan Oliver, Malvern, AR (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 12/945,109

(22) Filed: Nov. 12, 2010

(65) Prior Publication Data

US 2012/0118178 A1  May 17, 2012

(51) Int. Cl.
*B30B 15/06* (2006.01)
*B30B 1/34* (2006.01)
*B30B 1/38* (2006.01)

(52) U.S. Cl. .................. 100/269.01; 100/199; 100/237; 100/269.04; 100/269.19

(58) Field of Classification Search .................. 100/193, 100/194, 195, 199, 204, 219, 237, 257, 269.01, 100/269.04, 269.12, 269.17, 269.19; 156/228, 156/288

See application file for complete search history.

(56) References Cited

U.S. PATENT DOCUMENTS

| | | | | |
|---|---|---|---|---|
| 2,492,878 | A * | 12/1949 | Miollis | 426/414 |
| 3,940,648 | A | 2/1976 | Wielt et al. | |
| 4,479,426 | A * | 10/1984 | Olenfalk | 100/37 |
| 4,831,301 | A | 5/1989 | Neumann | |
| 4,854,994 | A * | 8/1989 | Breiter et al. | 156/228 |
| 6,018,207 | A | 1/2000 | Saban et al. | |
| 6,448,686 | B1 | 9/2002 | Dawson et al. | |
| 6,865,797 | B2 | 3/2005 | Walko et al. | |
| 7,057,324 | B2 | 6/2006 | Breznak et al. | |

* cited by examiner

*Primary Examiner* — Jimmy T Nguyen
(74) *Attorney, Agent, or Firm* — James W. Pemrick; Ernest G. Cusick; Frank A. Landgraff

(57) ABSTRACT

A method and apparatus are provided for compression of a lamination stack for a dynamoelectric machine. The apparatus includes a plurality of hanger brackets attached to a face frame, a plurality of force application tubes secured to the brackets, a plurality of force applying rams located beneath the force application tubes, a plurality of pressing plates located beneath the force applying rams, and a plurality of weight distribution plates located beneath the pressing plates. A compressive force is applied to the lamination stack by the force applying rams via the pressing plates and weight distribution plates.

14 Claims, 7 Drawing Sheets

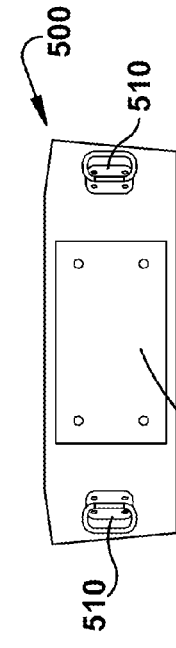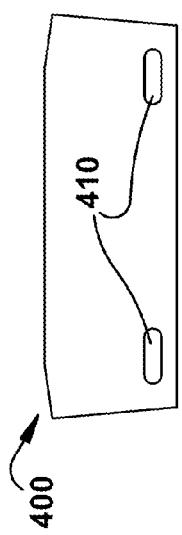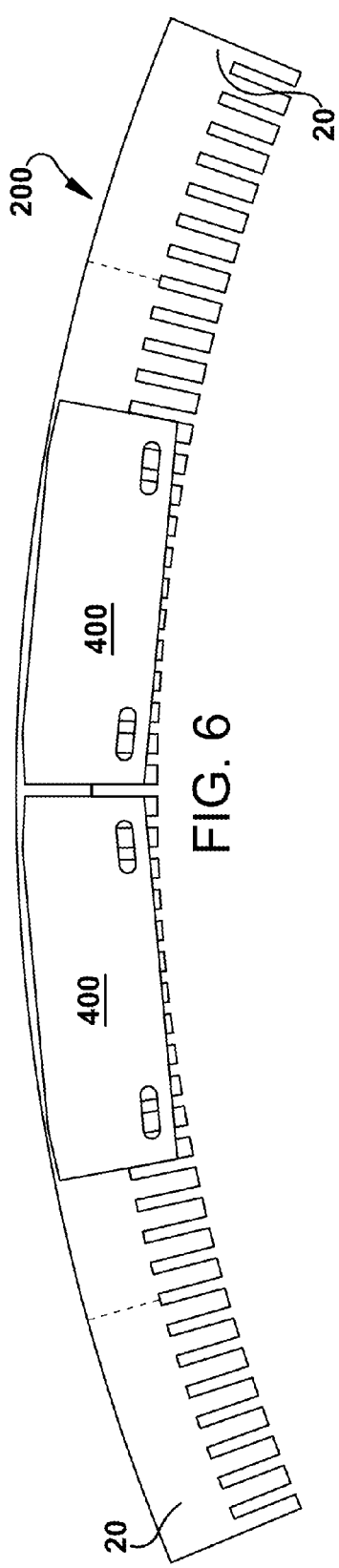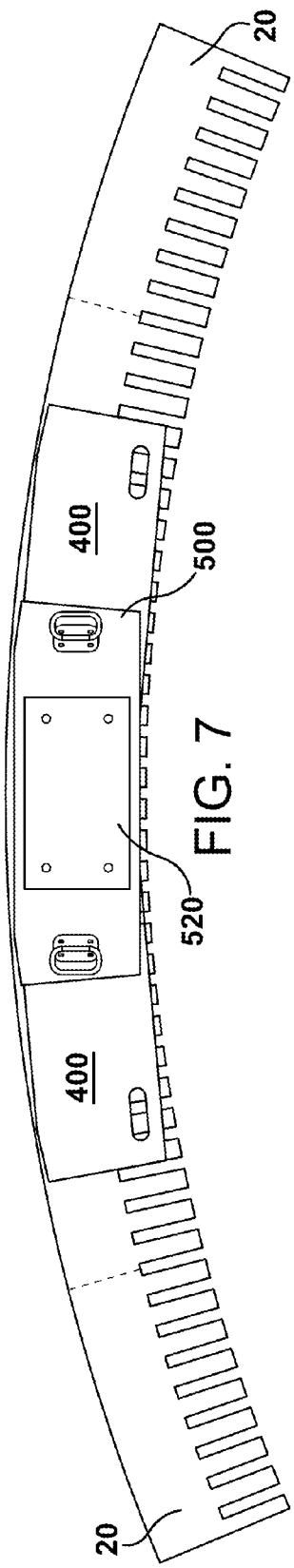

METHOD AND APPARATUS FOR COMPRESSION OF LAMINATION STACK FOR A DYNAMOELECTRIC MACHINE

BACKGROUND OF THE INVENTION

The present invention described herein relates generally to an apparatus for dynamoelectric machines. More specifically, present invention relates to an apparatus for compressing the lamination stack in the core of a dynamoelectric machine.

Stator core laminations, i.e., punchings, are generally arranged in a plurality of annular arrays thereof forming sets or packets of adjacent stator core laminations. The sets of annular arrays of laminations are axially spaced one from the other by space blocks and installed in a generator stator frame. The space blocks define ventilation passages for directing a cooling flow radially through the stator. Typically, the assembly of the laminations is performed manually by disposing the laminations on dovetail-shaped keybars which have male projections complementary to the female projections along the outer diameter of the individual laminations. During assembly, the lamination stack can develop undesirable waves caused by burrs created during the punching process. In addition, trapped air may also cause undesirable waves in the lamination stack.

The current known method for compressing the core during restack is to use loose pipes stacked under the top finger plates/clamping ring. Technicians must then manually torque each of the finger plate/clamp ring bolts, and re-torque the bolts multiple times in series to assure an equal pressure throughout the stack. A downside to this method is that (1) there is a high incident probability of the loose pipes falling with a domino effect into the core inner diameter during set up thereby endangering the technicians setting up for the compression operation, (2) the amount of pressure placed on the stack is of an unknown and uneven quantity, and (3) it involves a high number of hours for the set up needed for each compression cycle, which includes the removal of the pipes and associated hardware and the removal of the finger plates/clamp ring as well as re-installing all the aforementioned elements for the subsequent compression cycle.

BRIEF DESCRIPTION OF THE INVENTION

In an aspect of the present invention, an apparatus is provided for compression of a lamination stack for a dynamoelectric machine. The apparatus includes a plurality of hanger brackets attached to a face frame, a plurality of force application tubes secured to the plurality of brackets, a plurality of force applying rams, where one of the plurality of force applying rams is located beneath one of the plurality of force application tubes, a plurality of pressing plates located beneath the plurality of force applying rams, and a plurality of weight distribution plates located beneath the plurality of pressing plates. A compressive force is applied to the lamination stack by the plurality of force applying rams via the plurality of pressing plates and the plurality of weight distribution plates.

In another aspect of the present invention, a method is provided for compressing a lamination stack for a dynamoelectric machine. The method includes the steps of providing a lamination stack, providing a plurality of weight distribution plates and a plurality of pressing plates, providing a plurality of hanger brackets, providing a plurality of force application tubes, providing a plurality of force applying rams, placing the plurality of weight distribution plates and the plurality of pressing plates one at least one end of the lamination stack, attaching the plurality of hanger brackets to a face frame, attaching the plurality of force application tubes to the plurality of hanger brackets, placing the plurality of force applying rams between the plurality of force application tubes and the plurality of pressing plates, and applying a compressive force to the lamination stack with the plurality of force applying rams via the plurality of weight distribution plates and the plurality of pressing plates.

In yet another aspect of the present invention, an apparatus for compression of a lamination stack for a dynamoelectric machine is provided. The apparatus includes a plurality of hanger brackets attached to a face frame, a plurality of force application tubes secured to the plurality of hanger brackets, one or more air bags, where the one or more air bags are located beneath the plurality of force application tubes, a plurality of pressing plates located beneath the one or more air bags, and a plurality of weight distribution plates located beneath the plurality of pressing plates. A compressive force is applied to the lamination stack by the air bags via the plurality of pressing plates and the plurality of weight distribution plates.

BRIEF DESCRIPTION OF THE DRAWINGS

FIG. 4 is a top plan illustration of a weight distribution plate, according to an aspect of the present invention;

FIG. 5 is a top plan illustration of a pressing plate, according to an aspect of the present invention;

FIG. 6 is a top plan illustration of weight distribution plates arranged on top of a lamination stack, according to an aspect of the present invention;

FIG. 7 is a top plan illustration of weight distribution plates and a pressing plate arranged on top of a lamination stack, according to an aspect of the present invention;

DETAILED DESCRIPTION OF THE INVENTION

A dynamoelectric machine is defined as any machine that converts mechanical energy to electrical energy or converts electrical energy into mechanical energy. A motor or generator are two examples of dynamoelectric machines.

Figure 1:
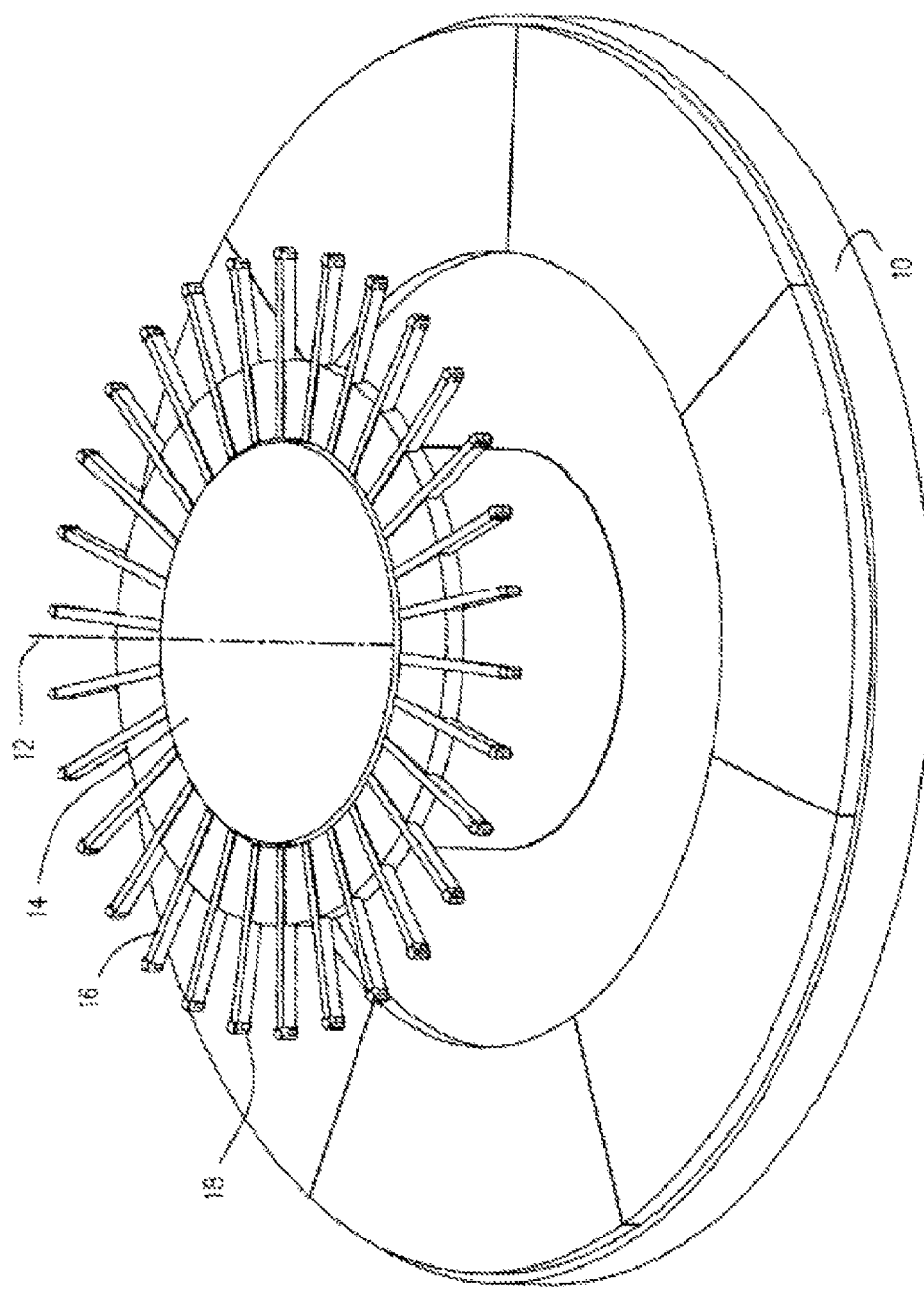
FIG. 1 is a schematic perspective illustration of a table, mandrel and locating fingers forming part of an apparatus for locating and stacking punchings.
Figure 2:
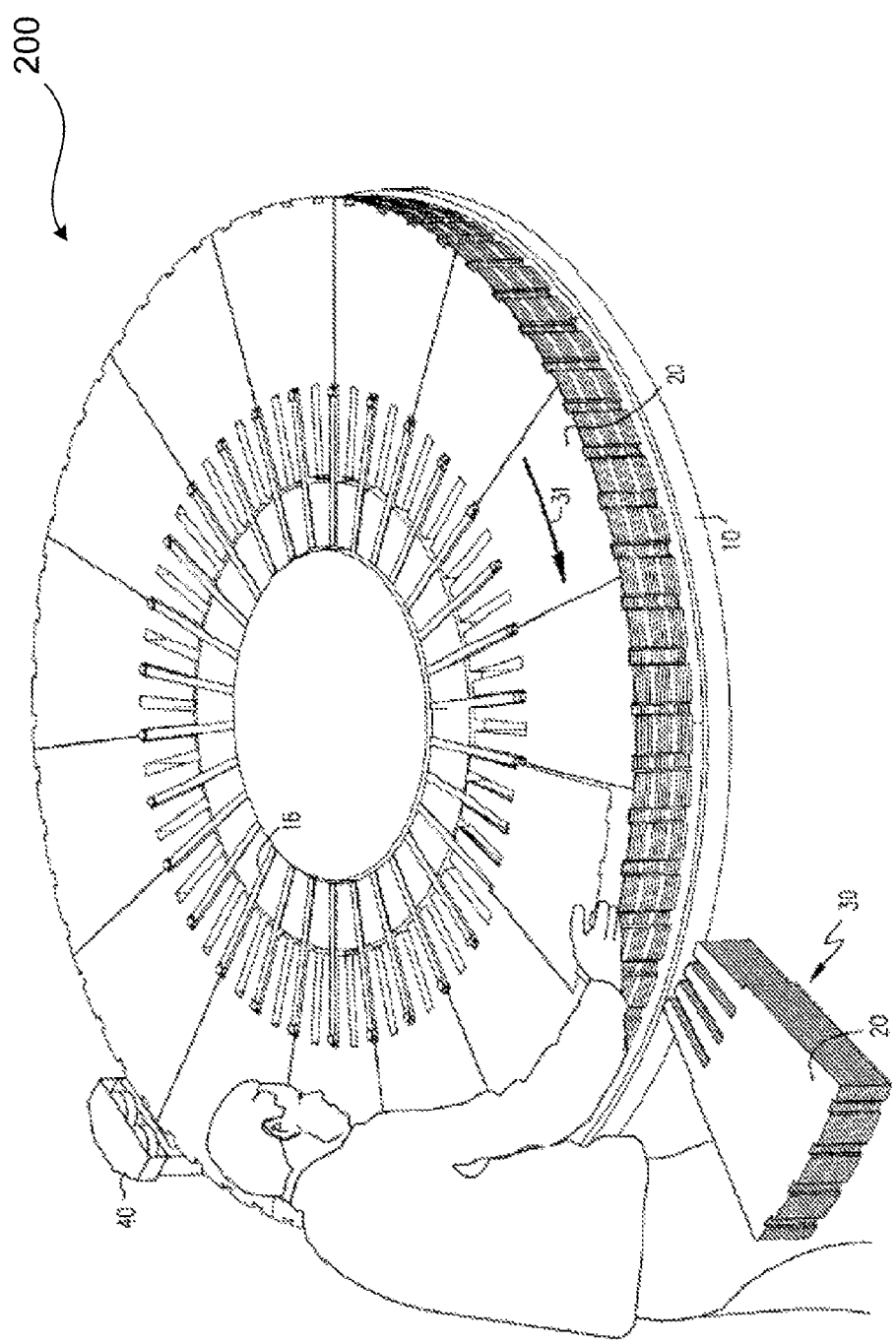
FIG. 2 is a schematic representation illustrating placement of individual punchings on the table to form stacked, annular arrays thereof.

Referring now to the drawings, and particularly to FIGS. 1 and 2, there is illustrated a support, e.g., a table 10, mounted for rotation about an axis 12 by a suitable drive, for example, an electric, hydraulic or pneumatic motor, not shown. The table 10 is preferably annular in form and surrounds a mandrel 14 rotatable about axis 12 with table 10. Mandrel 14 is also adjustable in elevation relative to table 10. Like the table, the mandrel may be elevated by any suitable, drive, preferably an electric motor. As illustrated, the mandrel mounts a plurality of radially outwardly extending fingers 16 which are rotatable with the mandrel 14 and adjustable in height as the mandrel's height is adjusted. The tips of the fingers 16 terminate in guides 18 for guiding and locating the punchings about the table in annular arrays thereof as described below.

Figure 3:
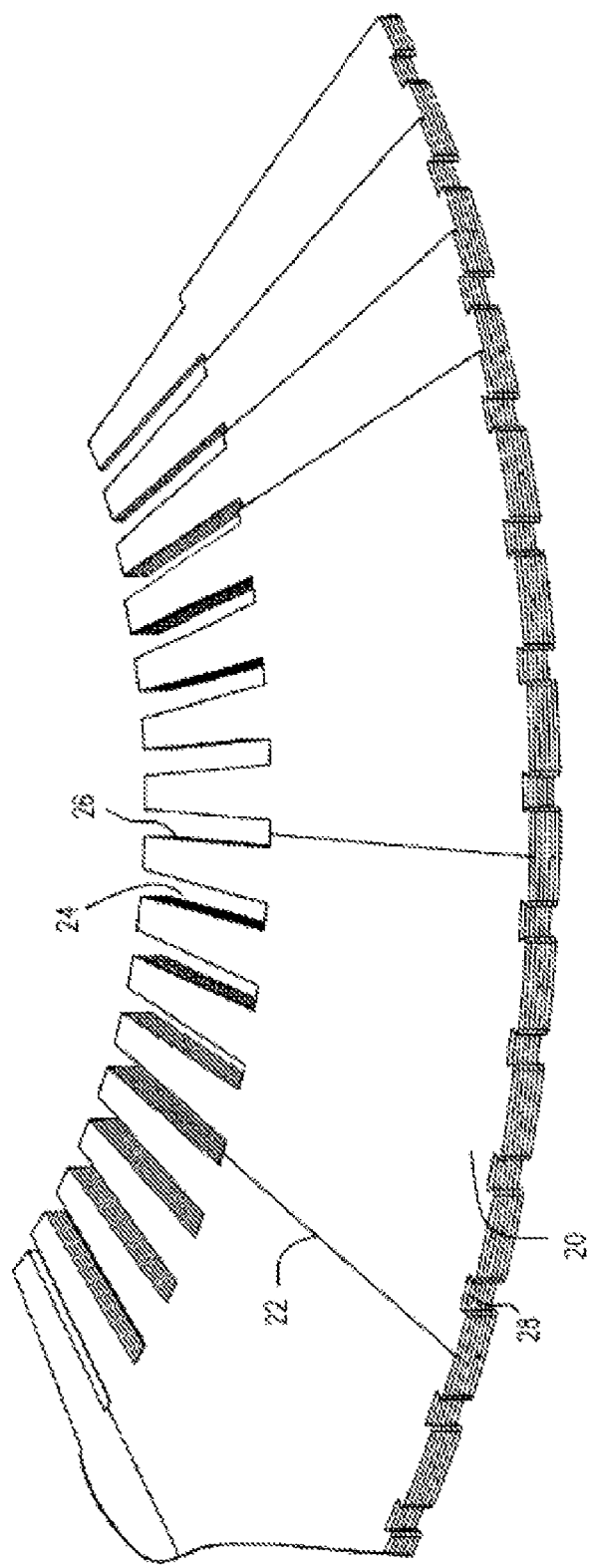
FIG. 3 is an enlarged perspective illustration of a plurality of punchings arranged in annular arrays thereof.

Referring to FIG. 3, a plurality of punchings 20 are illustrated. In the illustrated form of punchings, each punching has a generally radially extending edge 22, a plurality of full radially extending slots 24 spaced circumferentially one from the other along an inner, circumferentially extending margin and a radially extending half-slot 26 along opposite sides 22 of the punching adjacent the inner margin. Each punching may also include an optional dovetail shape 28 at circumferentially spaced locations along the outer margin thereof. As illustrated in FIG. 3, there are six layers of superposed punchings 20 for illustration purposes, although it will be appreciated that greater or fewer numbers of layers may be provided.

It will be seen in FIG. 3 that the radial juncture along the side edges 22 of adjacent punchings 20 of each layer does not underlie the joints between adjacent punchings of adjacent layers. In this illustrated embodiment and as one example only, the punchings are thus staggered in a circumferential direction relative to one another and the joints of circumferentially adjacent punchings of every fourth layer lie in vertical alignment one with the other.

It will be appreciated, however, that the half-slots 26 along opposite sides of each punching form full slots with the half-slots 26 of the circumferentially adjoining punchings. The slots 24 and 26 open radially inwardly for receiving guides 18 as noted below. In one example, there are fifteen punchings in each annular layer, with the side edges 22 of the punchings lying in registration and in a common plane with one another. The punchings are stacked one on top of the other in a staggered manner to form a set of a plurality of annular arrays of punchings. The sets, in turn, may be axially spaced from one another on the table by space blocks, not shown, disposed between the sets to form ventilation channels in the finished dynamoelectric machine stator frame. The fingers 16 terminate in guides 18. Each guide 18 includes a semispherical projection on the top of the associated distal end of the finger 16. The distal end of the finger 16 is received within a slot 24 of a punching 20.

Multiple sets of punchings are disposed along the table prior to lifting the sets from the table for installation into the dynamoelectric machine frame as described below. As one specific example only, fifteen punchings form an annular array thereof, the punchings being approximately 0.014 inches thick. A vertical height of approximately two inches for each set of punchings is preferred. This requires approximately 140-150 punchings, one over the other, to form a two-inch thick set of punchings in the axial direction. However, any number of punchings of any suitable thickness can be arranged to form a core of any suitable longitudinal length in a dynamoelectric machine (e.g., a motor and/or generator).

Referring back to FIG. 2, there is illustrated a station 30 where the punchings 20 are inserted onto table 10 as the table 10 rotates, as indicated by arrow 31, past the inserting station 30. In this aspect of the present invention, an individual locates the punching on top of the table or on top of a previously arranged annular array of punchings. As the individual lays the discrete punchings 20 on the table or on 10 top of a previously placed array, the punchings are disposed so that one or more fingers 16 is received within a full slot 24 or a half-slot 26 of the punching. The semi-spherical surfaces 18 assist to guide each punching about the fingers 16 and, hence, align the punching in a selected circumferential and radial position about the table relative to other punchings. As the table rotates, additional punchings are laid on the table and underlying arrays, with the side edges 22 adjoining one another. The individual also staggers the layers of punchings by offsetting the first of an additional 20 layer of punchings relative to the underlying array of punchings so that the joints between the freshly laid punchings do not overlie joints of the underlying punchings.

As the table rotates, the laid punchings may be engaged by a roller system 40 which ensures that the bases of the slots, both full 24 and half-slots 26, are engaged by the guides 18 thereby maintaining an accurate uniform alignment of the slots of the punchings and hence the punchings themselves on the table. System 40 maintains rollers against the outer margins of the circumferentially arrayed punchings. As the elevation of the uppermost layers of punchings increases, the mandrel with the attached fingers is also elevated. This is accomplished either continuously or incrementally in response to sensing the height of the uppermost layer of punchings and mechanically raising the mandrel and fingers in response to the sensed signal. The completed stack of punchings 20 form a lamination stack 200 that can form the stator core of a dynamoelectric machine (e.g., a motor or a generator).

FIG. 4 illustrates a top view of a weight distribution plate 400, according to an aspect of the present invention. The weight distribution plate 400 may have a generally rectangular shape or be configured to generally conform to a portion of the shape defined by the lamination stack. The weight distribution plate 400 may have one or more hand holds 410 incorporated therein to facilitate manipulation by an operator or technician. To further facilitate manual manipulation, the weight distribution plate 400 is preferably made of aluminum, aluminum alloy, titanium, titanium alloys, steel, steel alloys or other lightweight material, metal or metal alloy, and have a weight that is comfortably handled by one technician. Alternatively, the weight distribution plate 400 could be made of any suitable material, including but not limited to wood, rubber, ceramic or plastic, or combinations thereof.

FIG. 5 illustrates a top view of a pressing plate 500, according to an aspect of the present invention. The pressing plate 500 may have a generally rectangular shape or be configured to generally conform to a portion of the shape defined by the lamination stack. The pressing plate 500 may have one or more handles 510 or handholds incorporated therein to facilitate manipulation by an operator or technician. In one example, the handles 510 could be comprised of brackets mounted to the pressing plate 500, where the brackets also include wire loop type handles. In another example, the handles 510 could be replaced with hand holds similar to hand holds 410. The pressing plate 500 may also include a press contact pad 520, and a press makes contact with this portion of the pressing plate 500. To further facilitate manual manipulation, the pressing plate 500 is preferably made of aluminum, aluminum alloy, titanium, titanium alloys, steel, steel alloys or other lightweight material, metal or metal alloy, and have a weight that is comfortably handled by one technician. Alternatively, the pressing plate 500 could be made of any suitable material, including but not limited to wood, rubber, ceramic or plastic, or combinations thereof. Alternatively, the press contact pad 520 could be omitted and a separate set of additional pressing plates could be mounted on top of the pressing plates 500, where the additional pressing plates would facilitate increasing and/or distributing the pressing or compressive force as desired in the specific application.

FIG. 6 illustrates a top plan view of a lamination stack 200 having two weight distribution plates stacked thereon. In operation, during a lamination stack press cycle, the weight distribution plates 400 are placed on top of the lamination stack 200 and arranged over the entire circumference of the lamination stack 200. The lamination stack 200 may be a partially assembled lamination stack or a completed lamination stack. In some applications, it may be desirable to have a "staged" pressing operation where the lamination stack is pressed in stages prior to final completion.

FIG. 7 illustrates a top plan view of a lamination stack having two weight distribution plates 400 stacked thereon with a pressing plate 500 placed on top of the two weight distribution plates. Only a few plates are shown for clarity, and it is to be understood that both the weight distribution plates 400 and pressing plates 500 would be disposed around the entire circumference of the lamination stack. The pressing plates are preferably placed to overlie portions of two weight distribution plates 400.

As one example only, a pressing operation is now described. The weight distribution plates 400 and pressing plates 500 are set on top of the lamination stack 200. Each plate may cover a span of about 30" to about 36", but plates having any dimension can be used as desired in the specific application. The plates 400 and 500 are arranged to cover staggered joints allowing a per square inch (psi) load to be equally spread. After arrangement of the plates 400, 500 a force is put on the pressing plates 500 equaling a pounds per square inch compression generated thru the pressing plate 500—weight distribution plate 400 assembly into the core stack lamination assembly 200 of about 40 to 45 psi. However, any suitable pressure can be applied as desired in the specific application. The compressive force transferred to the lamination stack 200 compresses the stacked laminations 20 and removes trapped air, waves in the stack and compresses lamination burrs and/or upsets from the punching/laser cutting during the lamination manufacturing process.

Figure 8:
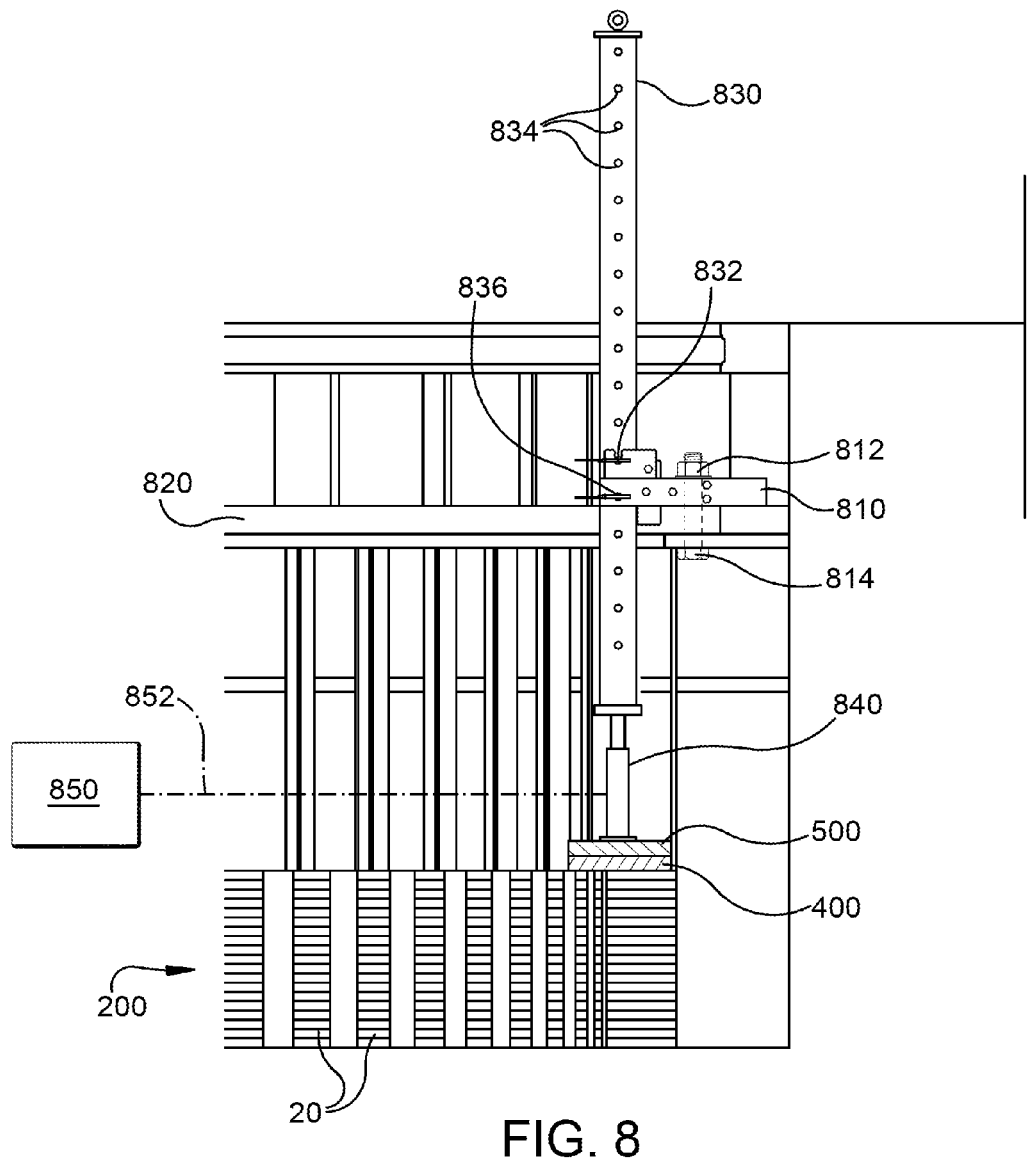
FIG. 8 is a partial, side view illustration of the apparatus arranged on top of a lamination stack, according to an aspect of the present invention.

FIG. 8 is a side view illustration of a portion of lamination stack 200 and a compression apparatus, according to an aspect of the present invention. The lamination stack 200 may be assembled as previously described, and it may be desirable to subject the lamination stack 200 to one or more compression operations during the stacking process. The compression operations are needed to remove trapped air, reduce waves in the stack and compress lamination burrs and/or upsets from the punching/laser cutting during the lamination manufacturing process.

A plurality of hanger brackets 810 can be attached to the face frame 820 (or motor/generator core frame) with any suitable fastening arrangement. In one example, the hanger brackets 810 are secured to the face frame 820 using nut 812 and bolt 814. The spacing of the hanger brackets 810 can be at any suitable interval around the circumference of the end of the lamination stack, and for a large utility grade generator the brackets 810 may be spaced about three feet apart from each other. However, any suitable spacing can be used as desired in the specific application.

A force application tube 830 can be hung on the bracket 810 with the use of a hanger pin 832 inserted through one of the through holes 834. The through holes 834 are spaced along the length of the force application tube at any desired interval. The force application tube 830 can be comprised of any suitable material and shape, and as non-limiting examples only the material may be steel or aluminum, and the cross-sectional profile may be rectangular or circular. The force application tube can be "locked" into position by inserting a height adjustment pin 836 through one of the through holes 834 and a correspondingly aligned hole in bracket 810. When both pins 834 and 836 are inserted, the force application tube 830 is locked in position and is ready for a compression operation. The plurality of through holes 830 enable a technician to accommodate for various lamination stack heights during assembly of the lamination stack 200 and the intervening compression operations.

A force applying ram 840 is inserted between the bottom end of force application tube 830 and the top of pressing plate 500. Typically, a plurality of rams will be installed around the lamination stack 200, with one force applying ram 840 placed beneath each force application tube 830. Each force applying ram 840 may be connected to a suitable control panel 850 via link 852. The force applying ram 840 may be comprised of a hydraulic ram, pneumatic ram or any other suitable ram or jack type device. The link 852 can be a wired or wireless link and may include any required hydraulic fluid or pneumatic supply and control lines required by the specific type of ram employed. The control panel 850 may be located on each force applying ram 840 or may control all the rams 840 from a local or remote location, which could be located near the lamination stack or in a remote operations center.

Figure 9:
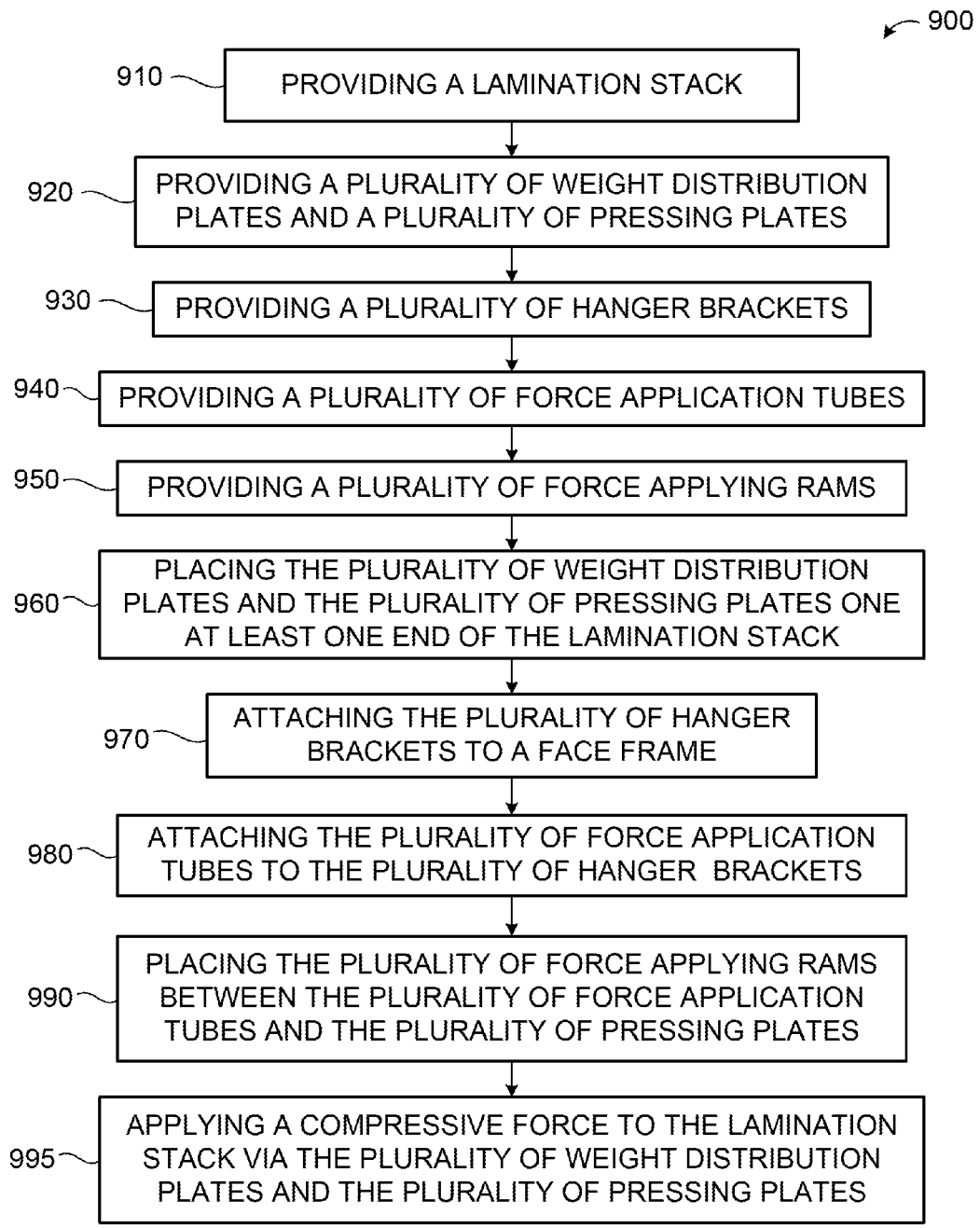
FIG. 9 is a flowchart of a method for compressing a lamination stack, according to an aspect of the present invention.

FIG. 9 is a flow chart of a method 900 for compressing a lamination stack in a dynamoelectric machine. The method 900 includes a step 910 of providing a lamination stack, a step 920 of providing a plurality of weight distribution plates and a plurality of pressing plates, a step 930 of providing a plurality of hanger brackets, a step 940 of providing a plurality of force application tubes, a step 950 of providing a plurality of force applying rams, a step 960 of placing the plurality of weight distribution plates and the plurality of pressing plates one at least one end of the lamination stack, a step 970 of attaching the plurality of hanger brackets to a face frame, a step 980 of attaching the plurality of force application tubes to the plurality of hanger brackets, a step 990 of placing the plurality of force applying rams between the plurality of force application tubes and the plurality of pressing plates, and a step 995 of applying a compressive force to the lamination stack with the plurality of force applying rams via the plurality of weight distribution plates and the plurality of pressing plates.

Steps 960 to 995 can be repeated as many times as desired during the assembly of the lamination stack. For example, during assembly of the lamination stack 200 the above method could be applied multiple times in between the stacking of the various layers of punchings 20. When the lamination stack 200 has no further punchings to be added, the desired steps in method 900 may be performed again. The method herein described can be applied to a dynamoelectric machine that is a motor or generator, and a lamination stack used in a stator core.

Figure 10:
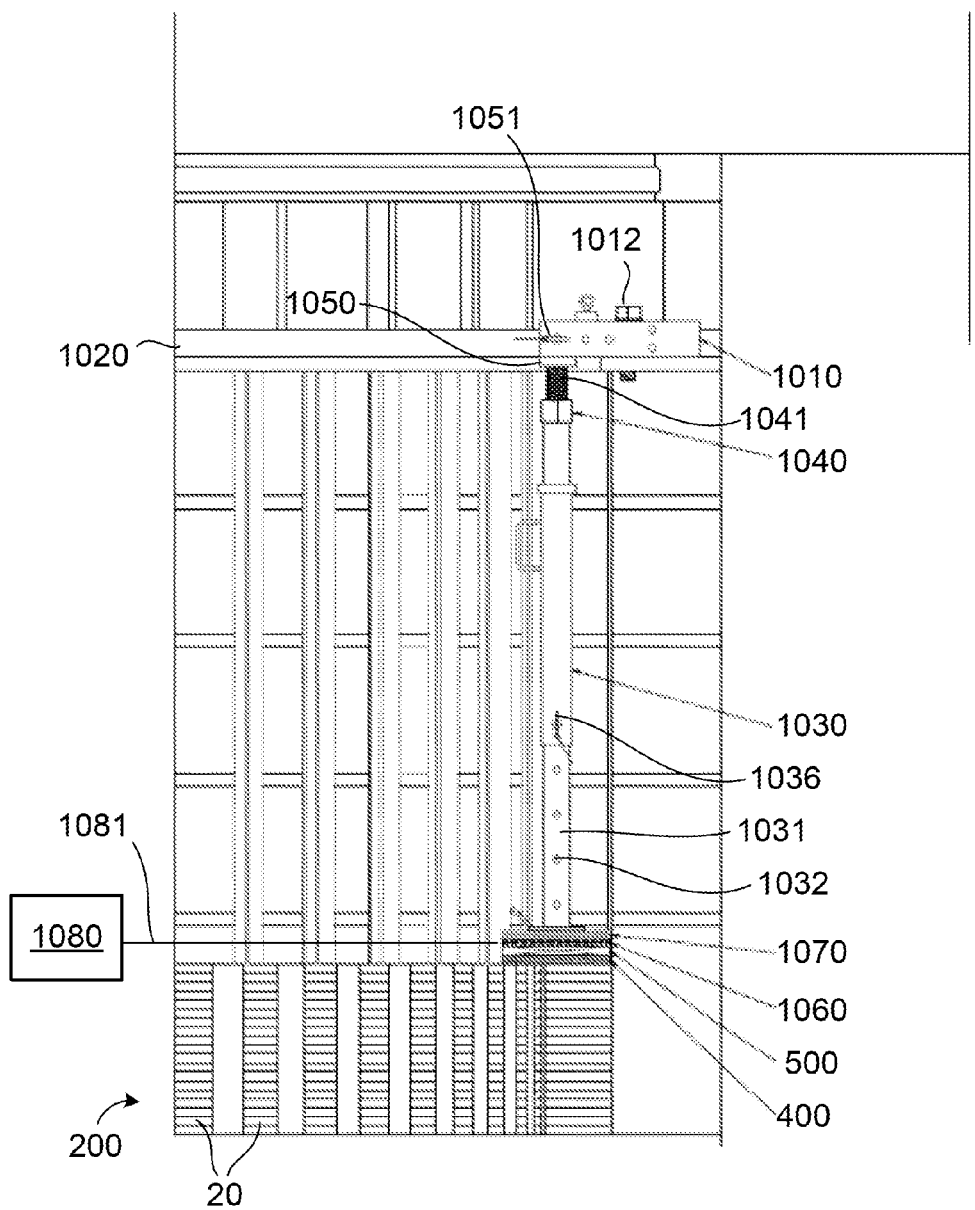
FIG. 10 is a partial, side view illustration of the apparatus arranged on top of a lamination stack, according to an aspect of the present invention.

FIG. 10 is a side view illustration of a portion of lamination stack 200 and a compression apparatus, according to an aspect of the present invention. The lamination stack 200 may be assembled as previously described, and it may be desirable to subject the lamination stack 200 to one or more compression operations during the stacking process. The compression operations are needed to remove trapped air, reduce waves in the stack and compress lamination burrs and/or upsets from the punching/laser cutting during the lamination manufacturing process.

A plurality of hanger brackets 1010 can be attached to the face frame 1020 (or motor/generator core frame) with any suitable fastening arrangement. In one example, the hanger brackets 1010 are secured to the face frame 1020 using a mechanical fastener 1012. The spacing of the hanger brackets 1010 can be at any suitable interval around the circumference of the end of the lamination stack, and for a large utility grade generator the brackets 1010 may be spaced about three feet apart from each other. However, any suitable spacing can be used as desired in the specific application.

A force application tube 1030 can be placed beneath bracket 1010. The force application tube 1030 includes a telescoping member 1031 having a plurality of through holes 1032 through which a height adjustment pin 1036 may be inserted. The outer tube 1030 also includes one or more through holes as well. The through holes 1032 are spaced along the length of the telescoping member 1031 at any desired interval. The force application tube 1030 and telescoping member 1031 can be comprised of any suitable material and shape, and as non-limiting examples only the material may be steel or aluminum, and the cross-sectional profile may be rectangular or circular.

As previously discussed, the force application tube 1030 can be "locked" into position by inserting a height adjustment pin 1036 through one of the through holes 1032 and a correspondingly aligned hole in the outer tube 1030. The plurality of through holes 1030 enable a technician to accommodate for various lamination stack heights during assembly of the lamination stack 200 and the intervening compression operations.

The height between the bottom of the force application tube 1030 (or the bottom of telescoping member 1031) can be "fine tuned" by the use of adjustment nut 1040 and threaded rod 1041. The rod 1041 can rotate within nut 1040 and adjust to a variety of heights. A hanger bracket 1050 can be attached to the threaded rod 1050 and include a through hole that enables the force application tube assembly 1030 to be hung from bracket 1010. A hanger pin 1051 can be inserted within through holes present in both the bracket 1010 and the hanger bracket 1050 to "hang" the force application tube assembly.

An air (or pneumatic) bag 1060 can be placed between the top of pressing plate 500 and the bottom of an air bag cover plate 1070. Typically, a plurality of bags 1060 will be installed around the lamination stack 200, with bag 1060 placed beneath each force application tube 1030. However, a single bag may be used or there may be a different number of bags than force application tubes 1030, as desired in the specific application. Each bag 1060 can be connected to a suitable compressed air source 1080 via suitable air supply conduit 1081. Each bag 1060 may be supplied with air individually or all the bags can be supplied with compressed air in a daisy chained or parallel arrangement. The air filled bags 1060 can be filled with compressed air (or any other suitable gas) to apply a compressive force on the lamination stack 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for compression of a lamination stack for a dynamoelectric machine, the apparatus comprising:
    a plurality of hanger brackets attached to a face frame;
    a plurality of force application tubes secured to the plurality of hanger brackets, the plurality of force application tubes having a plurality of through holes configured to accept a hanger pin and a height adjustment pin, the hanger pin is used to hang one of the plurality of force application tubes on one of the plurality of hanger brackets, and the height adjustment pin is used to lock one of the plurality of force application tubes to one of the plurality of hanger brackets;
    a plurality of force applying rams, where one of the plurality of force applying rams is located beneath one of the plurality of force application tubes;
    a plurality of pressing plates located beneath the plurality of force applying rams;
    a plurality of weight distribution plates located beneath the plurality of pressing plates;
    wherein, at least one of the plurality of force applying rams is located between a bottom end of one of the force application tubes and the top of one of the pressing plates.

2. The apparatus of claim 1, wherein each of the plurality of force applying rams is comprised of at least one of:
    a hydraulic ram, a pneumatic ram, and a jack.

3. The apparatus of claim 1, wherein the plurality of hanger brackets are secured to the face frame or a core frame of a generator or motor with a plurality of fasteners.

4. The apparatus of claim 3, wherein the plurality of fasteners are comprised of a nut and bolt arrangement.

5. The apparatus of claim 1, wherein each of the plurality of force applying rams is connected to a control panel.

6. The apparatus of claim 5, wherein the control panel simultaneously controls each of the plurality of force application rams.

7. The apparatus of claim 1, wherein the dynamoelectric machine is at least one of a motor and generator.

8. The apparatus of claim 1, wherein the lamination stack comprises a stator core.

9. An apparatus for compression of a lamination stack for a dynamoelectric machine, the apparatus comprising:
    a plurality of hanger brackets attached to a face frame;
    a plurality of force application tubes secured to the plurality of hanger brackets;
    one or more air bags, where the one or more air bags are located beneath the plurality of force application tubes;
    a plurality of pressing plates located beneath the one or more air bags;
    a plurality of weight distribution plates located beneath the plurality of pressing plates;
    wherein, a compressive force is applied to the lamination stack by the one or more air bags via the plurality of pressing plates and the plurality of weight distribution plates.

10. The apparatus of claim 9, wherein the plurality of force application tubes further comprise:
    a plurality of through holes, the plurality of through holes configured to accept a height adjustment pin; and
    an adjustment nut cooperating with a threaded rod, the threaded rod connected to a bracket that is attached to one of the plurality of hangar brackets with a hanger pin.

11. The apparatus of claim 9, wherein each of the one or more air bags is connected to and filled by a compressed air source.

12. The apparatus of claim 11, wherein the compressed air source simultaneously fills each of the one or more air bags with compressed air.

13. The apparatus of claim 9, wherein the dynamoelectric machine is at least one of a motor and generator.

14. The apparatus of claim 9, wherein the lamination stack comprises a stator core.

* * * * *